United States Patent [19]
Saeki et al.
[11] Patent Number: 5,034,370
[45] Date of Patent: Jul. 23, 1991

[54] COLOR DEVELOPER FOR PRESSURE-SENSITIVE RECORDING PAPER

[75] Inventors: Yukio Saeki; Yukio Tokunaga, both of Fujieda City, Japan
[73] Assignee: Sumitomo Durez Company, Ltd., Tokyo, Japan

[21] Appl. No.: 448,044
[22] Filed: Dec. 8, 1989
[51] Int. Cl.[5] ........ B41M 5/155; C09D 11/00
[52] U.S. Cl. ........ 503/210; 106/21; 503/211; 503/212; 503/214; 503/216; 503/325; 525/506
[58] Field of Search ........ 427/150-152; 503/208, 209, 210-212, 214, 216, 225; 525/506

[56] References Cited

U.S. PATENT DOCUMENTS 4,046,941 9/1977 Saito et al. ........ 428/323
4,806,521 2/1989 Umeda et al. ........ 503/216

FOREIGN PATENT DOCUMENTS 60-380038 8/1986 Japan ........ 503/225

*Primary Examiner*—Bruce H. Hess
*Attorney, Agent, or Firm*—James F. Tao; Richard D. Fuerle

[57] ABSTRACT

A color developer for pressure-sensitive recording paper is produced by admising components comprising:
(A) 100 parts by weight of a polyvalent metal salt of a co-condensation product of a substituted salicylic acid, an aromatic hydrocarbon and an aldehyde. Such a co-condensation product is obtained by reacting:
(a) a substituted salicylic acid,
(b) one or more aromatic hydrocarbons having 4 to 9 carbon atoms, and
(c) an aldehyde of 1 to 8 carbon atoms, in the presence of an acidic catalyst; and
(B) 5 to 200 parts by weight of one or more members selected from the group consisting of petroleum resins, terpene resins, modified terpene resins, coumaarone resins and modified coumarone resins.

The color developer is excellent in color density, resistance to yellow staining, fastness to light of color images and resistance to fading in water of color images, and in addition is capable of forming color images at a markedly increased speed.

14 Claims, No Drawings

COLOR DEVELOPER FOR PRESSURE-SENSITIVE RECORDING PAPER

BACKGROUND OF THE INVENTION

1. Field of the Invention

The present invention relates to a color developer for pressure-sensitive recording paper which is excellent in color density, resistance to yellow staining, fastness to light of color images and resistance to fading in water of color images, and in addition is capable of forming color images at a markedly increased speed.

2. Prior Art

In pressure-sensitive recording paper, there is utilized in general, a combination of an electron-accepting compound (hereinafter referred to as "color developer") and an electron-donating colorless dye (hereinafter referred to as "color former"), which is dissolved in a high-boiling solvent (hereinafter referred to as "capsule oil") contained in microcapsules. When the compound and the dye are brought into contact, they undergo a reaction to form color.

Among hitherto known color developers are inorganic color developers, such as acid clay, zeolite and kaolin, and organic color developers, such as phenol compounds, novolak resins, multi-valent metal salts of aromatic carboxylic acids and multi-valent metal salts of carboxyl-modified terpene phenol resins. There has also been proposed a color developer obtainable by the co-condensation of an aromatic carboxylic acid, or an aromatic carboxylic acid-aldehyde polymer, with a xylene resin. A polyhydric metal compound can be added to this resin. Such a color developer is disclosed in Japanese Patent Publication No. 38,038/86.

Copending patent application Ser. No. 07/296,091, filed Jan. 12, 1989, now U.S. Pat. No. 4,920,186 discloses a color developer comprising a polyvalent metal-bound carboxyl-modified p-alkylphenol-mesitylene-formaldehyde co-condensate.

Copending patent application Ser. No. 07/302,242, filed Jan. 27, 1989, now U.S. Pat. No. 4,920,185 discloses a color developer comprising a polyvalent metal-bound carboxyl-modified p-substituted phenol-xylene-formaldehyde co-condensate.

Copending patent application Ser. No. 07/370,966, filed June 26, 1989, now abandoned discloses a color developer that comprises a mixture of (1) a salicylic acid-xylene-formaldehyde co-condensate resin reacted with a polyvalent metal salt and (2) a petroleum resin.

Although inorganic color developers are capable of forming color quite rapidly, they suffer from the disadvantage that their capability of forming color deteriorates during storage due to adsorption of gase and moisture from the atmosphere. Phenol compounds are inferior in their color-forming properties. Novolak-type phenol resins, in particular, p-substituted phenol-formaldehyde resins, are excellent in color-forming properties and give color images which are highly resistant to fading in water. However, novolak-type phenol resins are susceptible to yellow staining caused by light or oxidative gases (NOx, SOx, etc.) contained in the atmosphere. Multi-valent metal salts of aromatic carboxylic acids are excellent in their color forming properties and resistance to yellow staining caused by light and oxidative gases. However, color images formed in the latter system are inferior in resistance to fading in water. Multi-valent metal salts of carboxy-modified terpene-phenol resins are excellent in their color-forming properties and resistance to fading in water of color images formed. However, they suffer from the disadvantages that they are only poorly resistant to yellow staining caused by light and oxidative gases. Co-condensation products of aromatic carboxylic acids, or aromatic carboxylic acid-aldehyde polymers, with xylene resins are inferior in their color-forming properties.

As described above, color developers which have hitherto been employed suffer from various disadvantages, and hence it has been desired to improve their properties.

The purpose of this invention is to produce a color developer for pressure-sensitive recording paper which is excellent in color density, resistance to yellow staining, and fastnes to light and resistance to fading in water of color images formed, and in addition is capable of forming color images at a markedly increased speed.

SUMMARY OF THE INVENTION

It has now been found that a color developer to satisfy the foregoing purposes can be produced by admixing components comprising:

(A) 100 parts by weight of a polyvalent metal salt of a co-condensation product of a substituted salicylic acid, an aromatic hydrocarbon and an aldehyde. Such a co-condensation product is obtained by reacting:

(a) one or more members selected from substituted salicylic acids represented by the following formula (I) or (II):

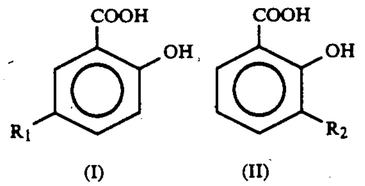

(I) (II)

wherein $R_1$ and $R_2$ each represents a hydrocarbyl group having 4 to 12 carbon atoms, (b) one or more aromatic hydrocarbons having 4 to 9 carbon atoms, and (c) an aldehyde, in the presence of an acidic catalyst; and (B) 5 to 200 parts by weight of one or more members selected from the group consisting of petroleum resins, terpene resins, modified terpene resins, coumarone resins and modified coumarone resins (hereinafter referred to as "petroleum and other resins").

Such products have excellent properties required for pressure-sensitive recording paper.

SPECIFIC EMBODIMENTS OF THE INVENTION

The present invention is concerned With a color developer for pressure-sensitive recording paper obtainable by admixing 100 parts by weight of the above-described polyvalent metal salts of substituted salicylic acid-aromatic hydrocarbon-aldehyde co-condensation products with 5 to 200 parts by weight of at least one member selected from petroleum and other resins as previously set forth.

The present invention will further be explained hereinbelow.

Substituted salicylic acids to be used in the present invention have a substituent group containing 4 or more carbon atoms at the 3 or 5 position thereof, as shown by the following Formula (I) or (II):

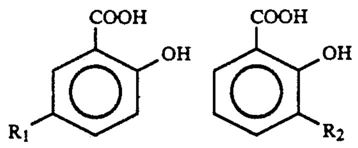

(I) (II)

wherein $R_1$ and $R_2$ each represents a hydrocarbyl group having 4 to 12 carbon atoms. Suitable hydrocarbyl groups include a sec-butyl group, a tert-butyl group, a tert-octyl group, a nonyl group, a dodecyl group, a phenyl group, a benzyl group, an α-methylbenzyl group or an α,α-dimethylbenzyl group. Such substituted salicylic acids can be obtained by the alkylation, aralkylation or arylation of unsubstituted salicylic acid or by the carboxylation of a substituted phenol according to the Kolbe-Schmitt reaction.

Polyvalent metal salts of substituted salicylic acid-aromatic hydrocarbon-aldehyde co-condensation products obtained by using a substituted salicylic acid having a substituent group of less than 4 carbon atoms are soluble in capsule oils only insufficiently and hence slow in color-forming speed. When a substituted salicylic acid having a substituent group of more than 12 carbon atoms is used, an undesirably low final color density will result.

In order to obtain a co-condensation product by the co-condensation of substituted salicylic acids, aromatic hydrocarbons and aldehydes, it is required that the reactivity between substituted salicylic acids and aldehyde is almost in the same level as that between aromatic hydrocarbons and aldehyde. However, the reactivity between unsubstituted salicylic acid and aldehyde and that between 4- and/or 6-substituted salicylic acids and aldehyde are far greater than that between aromatic hydrocarbons and formaldehyde. Therefore, when unsubstituted salicyclic acid or a 4- and/or 6-substituted salicyclic acid is subjected to co-condensation together with a aromatic hydrocarbon and aldehyde, there is formed a condensation product between unsubstituted salicylic acid or a 4- and/or 6-substituted salicylic acid, and the desired co-condensation product could not be obtained. The reactivity between 3,5-disubstituted salicylic acids and aldehyde is far less than that between aromatic hydrocarbons and aldehyde. Accordingly, when a 3,5-disubstituted salicylic acid is subjected to condensation together with an aromatic hydrocarbon and aldehyde, there is formed an aromatic hydrocarbon-aldehyde condensation product, and the desired co-condensation product could not be obtained.

Examples of substituted salicylic acids usable in the present invention include 3-sec-butylsalicylic acid, 3-tert-butylsalicyclic acid, 3-tert-octylsalicycli acid, 3-nonylsalicyclic acid, 3-dodecylsalicyclic acid, 3-phenylsalicylic acid, 3-benzylsalicyclic acid, 3-α-methylsalicylic acid, 3-α,α-dimethylsalicylic acid, 5-sec-butylsalicylic acid, 5-tert-butylsalicylic acid, 5-tertt-octylsalicylic acid, 5-nonylsalicylic acid, 5-dodecylsalicylic acid, 5-phenylsalicylic acid, 5-benzylsalicylic acid, 5α-methylbenzylsalicylic acid and 5α,α-dimethylbenzylsalicylic acid. In particular 5-sec-butylsalicylic acid, 5-tert-octylsalicylic acid and 5nonylsalicylic acid can be preferable.

As aromatic hydrocarbons, there can be used toluene, ethylbenzene, o-xylene, m-xylene, p-xylene, mesitylene and mixtures of these.

As aldehydes, there can be used any compound which can be a source of formaldehyde, including, e.g., formalin, trioxane, paraformaldehyde, and the like. Higher aldehydes up to 8 carbon atoms can be used, such as acetaldehyde, propionaldehyde, butyraldehyde and octyl aldehyde.

As a catalyst for the co-condensation of substituted salicylic acid, aromatic hydrocarbons and aldehydes, there can be used organic or inorganic acids, including, e.g., hydrochloric acid, sulfuric acid, phosphoric acid, oxalic acid, formic acid, p-toluenesulfonic acid, benzenesulfonic acid, phenolsulfonic acid, and the like.

The co-condensation products of substituted salicylic acids, aromatic hydrocarbons and aldehydes can be obtained by admixing 1 mol of substituted salicylic acid with 1 to 10 mol of aromatic hydrocarbons and 1 to 10 mol of formaldehydes; adding thereto a mixture of an acidic catalyst and an acidic solvent (such as acetic acid, propionic acid, etc.) which is capable of dissolving the substituted salicylic acid and compatible with the aromatic hydrocarbons, thereby rendering the reaction system homogeneous; allowing the reaction to proceed at 90° to 150° C. for 1 to 10 hours; washing the resulting reaction mixture with hot water to remove the catalyst and the acidic solvent; and then subjecting the mixture to vacuum distillation to remove water and unreacted aromatic hydrocarbons.

The co-condensation products can be converted into their polyvalent metal salts, e.g., by:

(1) allowing the products to react with oxides, hydroxides, chlorides, carbonates, sulfates or the like of a polyvalent metal at 100° to 200° C. in the presence of an ammonium salt, such as ammonium sulfate, ammonium bicarbonate, ammonium benzoate, etc.; or (2) dissolving the products in water or an alcohol together with an alkali metal hydroxide (such as potassium hydroxide, sodium hydroxide, etc.) and then adding thereto a salt of a polyvalent metal soluble in water or alcohols to effect double decomposition.

As polyvalent metals, there can be used zinc, tin, aluminum and nickel.

The color-developers for pressure-sensitive recording paper according to the invention can be obtained by admixing the thus obtained polyvalent metal salts of substituted salicylic acid-aromatic hydrocarbon-formaldehyde co-condensation products with petroleum and/or other resins.

In the above mixing step, the petroleum and other resins are used preferably in an amount of 5 to 200 parts by weight, more preferably 20 to 130 parts by weight, per 100 parts by weight of the co-condensation products. When the resins are used in an amount less than 5 parts by weight, per 100 parts by weight, there will be attained only an insufficient improvement in the color-forming speed, whereas in the case where the amount is more than 200 parts by weight, a lowering in color-forming speed and in color density results.

As petroleum resins, there can be used any petroleum resins, including aromatic, fatty, co-polymerized and alicyclic petroleum resins. Examples of usable terpene resins include naturally occurring terpene resins and polyterpene resins synthesized from turpentine oils. Examples of usable modified terpene oils include terpene-phenol resins prepared through copolymerization with phenols, and aromatic-modified terpene resins prepared through copolymerization with aromatic monomers. As preferable examples of usable coumarone resins, mention may be made of mixtures of (co)-polymers consisting mainly of indene, styrene and coumarone residues, containing 20 to 60 parts by weight of styrene residues and/or 10 to 30 parts by weight of coumarone residues, per 100 parts by weight of indene residues, and prepared by mixing homopolymers of the three monomers and/or copolymers of the two or three monomers. As modified coumarone resins, there can be used those prepared by modifying coumarone resins, such as those described above, with phenolic compounds, such as phenol, cresol and p-substituted phenols, up to 30 to 50%.

The admixing between the polyvalent metal salts of the co-condensation products and the petroleum and/or other resins is effected in such a way whereby a uniform phase can be formed therefrom. For example, (1) the two components can be heated, admixed in molten state and then solidified through cooling; or (2) the two components can be dissolved in a solvent having a high solubilizing power, and the solvent is evaporated therefrom at ordinary pressure or at a reduced pressure.

Pressure-sensitive recording paper can be produced from the color developer in accordance with a method such as one of the following:

(1) a method in which the color developer is dispersed into water; inorganic pigments, binders, etc. are added thereto; and the resulting mixture is impregnated into or coated onto a support;
(2) a method in which the color developer is dissolved in an organic solvent; inorganic pigments, binders, etc. are added thereto; and the resulting mixture is then impregnated into or coated onto a support;
(3) a method in which the color developer is incorporated into a support during its production; or
(4) a method according to any of the methods (1) to (3), wherein color formers or microcapsules containing color formers are additionally incorporated.

The color developer of the present invention can be rendered in an ink by dissolving it in a solvent, and the ink can be coated onto predetermined areas of a support so as to obtain a lower sheet that forms color only on the coated areas.

Examples of usable supports include paper, synthetic paper, plastic films, metal foils and composite sheets prepared from these. Examples of usable inorganic pigments include acid clay, activated clay, kaolin, calcium carbonate, aluminum hydroxide, talc, zeolite, and the like. As binders, there can be used latexes, and water-soluble or water-dispersible binders.

As described above, the color developer of the present invention can be used for the preparation of pressure-sensitive recording paper in various manners. However, the mode of use of the developer is not limited to those described above. It is possible to use the color developer of the present invention in combination with known inorganic or organic color developers, such as acid clay, p-substituted phenol-formaldehyde resins and metal salts thereof, and aromatic carboxylic acids and metal salts thereof. It is also possible to incorporate known antioxidants, UV absorbers, etc. into the pressure-sensitive recording paper according to the invention.

The color developer of the present invention can be highly effective for color formers which have hitherto been used in pressure-sensitive recording paper. For example, the color developer can be employed in combination with such color formers as fluoranes, triphenylmethane phthalides, spiropyrans, phenothiazines, triphenylmethanes and indoles. The color developer of the present invention for use in pressure-sensitive recording paper exhibits excellent color density, resistance to yellow staining, fastness to light of color images, and is capable of forming color images at a markedly increased speed. Although the reason wh the color developer of the invention exhibits such excellent properties is not clear, the following presumptions can be made:

Polyvalent metal salts of salicylic acid, although their color-forming properties are excellent, are only poorly soluble to capsule oils and hence form color only slowly. Petroleum and other resins have only low color-forming capabilities although their solubility to capsule oils is quite high. Polyvalent metal salts of salicylic acid are not compatible with petroleum and other resins, and hence their mixtures do not form a uniform phase. On the other hand, the polyvalent metal salts of the unsubstituted salicylic acid-aromatic hydrocarbon-formaldehyde co-condensation product according to the invention have an enhanced solubility to capsule oils and a greater compatibility with petroleum and other resins, thanks to co-condensation with aromatic hydrocarbons. Because of this, a uniform phase can be formed at the time when they are admixed. This leads to an enhanced solubility to capsule oils and a markedly increased color-forming speed. In addition, resistance to yellow staining, fastness to light of color images, resistance to fading in water of color images, etc. can also be improved as the moieties of salicylic acid polyvalent metal salts are covered with petroleum and other resins.

EXAMPLES

The present invention will further be illustrated by examples. The invention, however, will by no means be limited to these examples. In the examples, "parts" means "parts by weight," and temperatures shall be in degrees Celsius.

Synthesis Example 1

To a mixture of 19.4 parts of 5-sec-butylsalicylic acid, 18.4 parts of toluene, 3.8 parts of 87% paraformaldehyde and 30 parts of acetic acid was added 2.0 parts of 95% sulfuric acid (catalyst). After being heated under reflux for 4 hours, the reaction mixture was washed with water, and unreacted toluene and water were removed by vacuum distillation to give 31 parts of 5-sec-butylsalicylic acid-toluene-formaldehyde co-condensation product. 10 parts of the co-condensation product was added to 14 parts of aqueous 10% sodium hydroxide solution and dissolved at 80° C. The resulting solution was cooled to 40° C., and 2.4 parts of zinc chloride was added thereto. After the reaction had been allowed to proceed at 40° C. for 1 hour, precipitates formed were collected by filtration, washed with water and dried to give 11.5 parts of zinc salt of 5-sec-butylsalicylic acid-toluene-formaldehyde co-condensation product.

Synthesis Example 2

11 parts of zinc salt of 5-tert-butylsalicylic acid-mesitylene-formaldehyde co-condensation product was obtained in a similar manner as in Synthesis Example 1, except that 19.4 parts of 5-tert-butylsalicylic acid was used instead of 19.4 parts of 5-sec-butylsalicylic acid, and 24 parts of mesitylene was used instead of 18.4 parts of toluene.

Synthesis Example 3

34 parts of 5-tert-octylsalicylic acid-toluene-formaldehyde co-condensation product was obtained in a similar manner as in Synthesis Example 1, except that 25.0 parts of 5-tert-octylsalicylic acid was used instead of 19.4 parts of 5-sec-butylsalicylic acid. 10 parts of the co-condensation product was added to 19.2 parts of aqueous 10% potassium hydroxide solution, dissolved at 80° C. and cooled to 40° C. To this was added 34 parts of 10% aqueous solution of stannous chloride dihydrate, and the reaction was allowed to proceed at 40° C. for 1 hour. Precipitates formed were collected by filtration, washed with water and dried to give 13 parts of tin salt of the 5-tert-octylsalicylic acid-toluene-formaldehyde co-condensation product.

Synthesis Example 4

To a mixture of 26.4 parts of 5-nonylsalicylic acid, 5.9 parts of m-xylene, 3.4 parts of sym-trioxane and 15 parts of acetic acid was added 4.0 parts of p-toluenesulfonic acid (catalyst). After being heated under reflux for 5 hours, the reaction mixture was washed with water, and unreacted m-xylene and water were removed by vacuum distillation to give 38 parts of 5-nonylsalicylic acid-m-xylene-formaldehyde co-condensation product. To 10 parts of the co-condensation product was added gradually a mixture of 0.9 parts of zinc oxide and 0.5 parts of ammonium hydrogencarbonate at a temperature of 150° C. After the completion of the addition, the reaction was allowed to proceed for an additional hour at 150° C. to give 10.8 parts of zinc salt of 5-nonylsalicylic acid-m-xylene-formaldehyde co-condensation product.

Synthesis Example 5

To a mixture of 30.6 parts of 5-dodecylsalicylic acid, 21.2 parts of p-xylene, 3.8 parts of 87% paraformaldehyde and 30 parts of acetic acid was added 2.0 parts of 95% sulfuric acid (catalyst). After being heated under reflux for 6 hours, the reaction mixture was washed with water, and unreacted p-xylene and water were removed by vacuum distillation to give 43 parts of 5-dodecylsalicylic acid-p-xylene-formaldehyde co-condensation product. 10 parts of the co-condensation product was added to 32 parts of aqueous 10% potassium hydroxide solution and dissolved at 80° C. The solution was cooled to 40° C., and 28 parts of aqueous 10% solution of nickel chloride hexahydrate was added thereto. After the reaction had been allowed to proceed at 40° C. for 30 minutes, precipitates formed were collected by filtration, washed with water and dried to give 11 parts of nickel salt of 5-dodecylsalicylic acid-p-xylene-formaldehyde co-condensation product.

Synthesis Example 6

13 partsof tin salt of 5-phenylsalicylic acid-toluene-formaldehyde co-condensation product was obtained in a similar manner as in Synthesis Example 3, except that 21.4 parts of 5-phenylsalicylic acid was used instead of 25 parts of 5-tert-octylsalicylic acid.

Synthesis Example 7

To a mixture of 22.8 parts of 5-benzylsalicylic acid, 21.2 parts of ethylbenzene, 3.8 parts of 87% paraformaldehyde and 25 parts of acetic acid was added 1.0 part of 95% sulfuric acid (catalyst). After being heated under reflux for 4 hours, the reaction mixture was washed with water, and unreacted ethylbenzene and water were removed by vacuum distillation to give 33 parts of 5-benzylsalicylic acid-ethylbenzene-formaldehyde co-condensation product. 10 parts of the co-condensation product was converted into its zinc salt in a similar manner as in Synthesis Example 1. There was obtained 11 parts of zinc salt of 5-benzylsalicylic acid-ethylbenzene-formaldehyde co-condensation product.

Synthesis Example 8

To a mixture of 24.2 parts of 5-α-methylbenzylsalicylic acid, 21.2 parts of o-xylene, 8.9 parts of 37% formalin and 25 parts of acetic acid was added 4.0 parts of 95% sulfuric acid (catalyst). After being heated under reflux for 5 hours, the reaction mixture was washed with water, and unreacted o-xylene and water were removed by vacuum distillation to give 35 parts of 5-α-methylbenzylsalicylic acid-o-xylene-formaldehyde co-condensation product. 10 parts of the co-condensation product was converted into its tin salt in a similar manner as in Synthesis Example 3. There was obtained 13 parts of tin salt of 5-α-methylbenzylsalicylic acid-o-xylene-formaldehyde co-condensation product.

Synthesis Example 9

33 parts of 5-α,α-dimethylbenzylsalicylic acid m-xylene-formaldehyde co-condensation product was obtained in a similar manner as in Synthesis Example 4, except that 25.6 parts of 5-α,α-dimethylbenzylsalicylic acid was used instead of 26.4 parts of 5-nonylsalicylic acid. 10 parts of the co-condensation product was converted into its nickel salt in a similar manner as in Synthesis Example 5. There was obtained 11 parts of nickel salt of 5-α,α-dimethylbenzylsalicylic acid-m-xylene-formaldehyde co-condensation product.

Synthesis Example 10

To a mixture of 21.4 parts of 3-phenylsalicylic acid, 18.4 parts of toluene, 3.8 parts of 87% paraformaldehyde and 30 parts of acetic acid was added 2.0 parts of 95% sulfuric acid (catalyst). After being heated under reflux for 4 hours, the reaction mixture was washed with water, and unreacted toluene and water were removed by vacuum distillation to give 32 parts of 3-phenylsalicylic acid-toluene-formaldehyde co-condensation product. 10 parts of the co-condensation product was converted into its zinc salt in a similar manner as in Synthesis Example 4. There was obtained 10.8 parts of zinc salt of 3-phenylsalicylic acid-toluene-formaldehyde co-condensation product.

Synthesis Example 11

13 parts of tin salt of 3-α-methylbenzylsalicylic acid-o-xylene-formaldehyde co-condensation product was obtained in a similar manner as in Synthesis Example 8, except that 3-α-methylbenzylsalicylic acid was used instead of 5-α-methylbenzylsalicylic acid.

Synthesis Example 12

To a mixture of 13.8 parts of salicylic acid, 18.4 parts of toluene, 6.9 parts of 87% paraformaldehyde and 30 parts of acetic acid was added 1.0 part of sulfuric acid (catalyst). After being heated under reflux for 4 hours, the reaction mixture was washed with water, and unreacted toluene and water were removed by vacuum distillation to give 31 parts of salicylic acid-toluene-formaldehyde co-condensation product. 10 parts of the co-condensation product was added to 41 parts of aqueous 10% sodium hydroxide solution and dissolved at 80° C. The resulting solution was cooled to 40° C., and 7.0 parts of zinc chloride was added thereto. After the reaction had been allowed to proceed at 40° C. for 1 hour, precipitates formed were collected by filtration, washed with water and then dried to give 12 parts of zinc salt of salicylic acid-toluene-formaldehyde co-condensation product.

Synthesis Example 13

11 parts of zinc salt of 5-α-methylsalicyclic acid-toluene-formaldehyde co-condensation product was obtained in a similar manner as in Synthesis Example 12, except that 15.2 parts of 5-α-methylsalicylic acid was used instead of 13.8 parts of salicylic acid.

Components used in the above synthesis examples are summarized in Table 1.

EXAMPLES 1 to 11

In a molten state at 150° C., 100 parts of each of the polyvalent metal salts of the unsubstituted salicylic acid-aromatic hydrocarbon-aldehyde co-condensation products obtained in the above synthesis examples was mixed with a resin shown in Table 2, and the resulting mixtures were cooled and solidified to give color developers.

Comparative Examples 1 to 3

In a molten state at 150° C., 100 parts each of the polyvalent metal salts of the unsubstituted salicylic acid-aromatic hydrocarbon-formaldehyde co-condensation products prepared in Synthesis Examples 12 and 13 or tin salt of 5-tert-octylsalicylic acid was mixed separately with a resin shown in Table 2, and the resulting mixtures were cooled and solidified to give color developers.

Comparative Example 4

The tin salt of 5-tert-octylsalicylic acid-toluene-formaldehyde co-condensation product obtained in Synthesis Example 3 was used as a color developer.

Comparative Example 5

A mixture of 170 parts of p-phenylphenol, 22.5 parts of 80% paraformaldehyde, 1.7 parts of p-toluenesulfonic acid and 200 parts of toluene was allowed to react at 100° C. for 2 hours, and then the toluene and water were taken off by vacuum distillation. There was obtained a p-phenylphenol-formaldehyde resin having a softening point of 85° C. The thus obtained resin was used as a color developer.

40 parts each of the color developers prepared in Examples 1 to 11 and Comparative Examples 1 to 5 was charged separately into an attriter together with 1 part of an anionic surface active agent (Orotan 731 manufactured by Rohm & Haas Co.), 0.1 parts of polyvinyl alcohol powders and 58.9 parts of water, and wet-pulverized for 8 hours to give dispersions containing particles having a particle size of 5 μ or less.

Each of the dispersions was separately charged into a mixer together with ingredients shown in Table 3 and mixed for 1 hour to prepare uniform coating liquids. Each of the liquids was coated on a high quality paper at a coverage of 5 g/m$^2$ (based on dry weight) to give 16 developer papers having thereon a developer layer.

TABLE 1

| Synthesis Examples | Components in Polyvalent Metal Salts of Unsubstituted Salicylic Acid-Aromatic Hydrocarbon-Formaldehyde Co-condensation Products | | | |
|---|---|---|---|---|
| | Substituted Salicylic Acids | Aromatic Hydrocarbons | Formaldehydes | Polyvalent Metals |
| 1 | 5-sec-butylsalicylic acid | Toluene | 87% paraformaldehyde | Zinc |
| 2 | 5-tert-butylsalicylic acid | Mesitylene | 87% paraformaldehyde | Zinc |
| 3 | 5-tert-octylsalicylic acid | Toluene | 87% paraformaldehyde | Tin |
| 4 | 5-nonylsalicylic acid | m-xylene | sym-trioxane | Zinc |
| 5 | 5-dodecylsalicylic acid | p-xylene | 87% paraformaldehyde | Nickel |
| 6 | 5-phenylsalicylic acid | Toluene | 87% paraformaldehyde | Tin |
| 7 | 5-benzylsalicylic acid | Ethylbenzene | 87% paraformaldehyde | Zinc |
| 8 | 5-α-methylbenzylsalicylic acid | o-xylene | 37% formalin | Tin |
| 9 | 5-α,α-dimethylbenzylsalicylic acid | m-xylene | sym-trioxane | Nickel |
| 10 | 3-phenylsalicylic acid | Toluene | 87% paraformaldehyde | Zine |
| 11 | 3-α-methylbenzylsalicylic acid | o-xylene | 37% formalin | Tin |
| 12 | Salicylic acid | Toluene | 87% paraformaldehyde | Zinc |
| 13 | 5-methylsalicylic acid | Toluene | 87% paraformaldehyde | Zinc |

TABLE 2

| Kinds and Amounts of Resins Incorporated | | | |
|---|---|---|---|
| Number | Polyvalent Metal Salts of Co-condensed Resins | Kinds of Incorporated Resins | Amount (Parts) |
| Example 1 | Polyvalent metal salt of co-condensed resin prepared in Synthesis Example 1 | Coumarone N-100 (coumarone resin modified with phenol manufactured by Nippon Steel Chemical Co., Ltd.) | 100 |
| Example 2 | Polyvalent metal salt of co-condensed resin prepared in Synthesis Example 2 | Petrosin PR-100 (Aromatic petroleum resin manufactured by Mitsui Petrochemical Ind., Ltd.) | 100 |
| Example 3 | Polyvalent metal salt of co-condensed resin prepared in Synthesis Example 3 | Coumarone G-90 (Coumarone resin manufactured by Nippon Steel Chemical Co., Ltd.) | 80 |
| Example 4 | Polyvalent metal salt of co-condensed resin prepared in Synthesis Example 4 | YS Resin Px-1000 (Terpene resin manufactured by Yasuhara Yushi Kogyo K.K.) | 120 |
| Example 5 | Polyvalent metal salt of co-condensed resin prepared in Synthesis Example 5 | Hilets T-100X (Aliphatic petroleum resin manufactured by Mitsui Petrochemical Ind., Ltd.) | 80 |
| Example 6 | Polyvalent metal salt of co-condensed | Hiresin #90 (Copolymerized petroleum | 80 |

TABLE 2-continued

| Kinds and Amounts of Resins Incorporated | | | |
|---|---|---|---|
| Number | Polyvalent Metal Salts of Co-condensed Resins | Kinds of Incorporated Resins | Amount (Parts) |
| | resin prepared in Synthesis Example 6 | resin manufactured by Toho Kagahu K.K.) | |
| Example 7 | Polyvalent metal salt of co-condensed resin prepared in Synthesis Example 7 | YS Polyster T-100 (Terpene-phenol resin manufactured by Yasuhara Yushi Kogyo K.K.) | 70 |
| Example 8 | Polyvalent metal salt of co-condensed resin prepared in Synthesis Example 8 | Coumarone G-90 (Coumarone resin manufactured by Nippon Steel Chemical Co., Ltd.) | 100 |
| Example 9 | Polyvalent metal salt of co-condensed resin prepared in Synthesis Example 9 | Petrosin PR-100 (Aromatic petroleum resin manufactured by Mitsui Petrochemical Ind., Ltd.) | 80 |
| Example 10 | Polyvalent metal salt of co-condensed resin prepared in Synthesis Example 10 | YS Resin Px-100 (Terpene resin manufactured by Yushi Kogyo K.K.) | 100 |
| Example 11 | Polyvalent metal salt of co-condensed resin prepared in Synthesis Example 11 | Hiresin #90 (Copolymerized petroleum resin manufactured by Toho Kagaku K.K.) | 100 |
| Comparative Example 1 | Polyvalent metal salt of co-condensed resin prepared in Synthesis Example 12 | Coumarone N-100 (Coumarone resin modified with phenol manufactured by Nippon Steel Chemical Co., Ltd.) | 100 |
| Comparative Example 2 | Polyvalent metal salt of co-condensed resin prepared in Synthesis Example 13 | Coumaron N-100 (Coumarone resin modified with phenol manufactured by Yasuhara Yushi Kogyo K.K.) | 100 |
| Comparative Example 3 | (Tin salt of 5-tert-octylsalicylic acid) | Coumarone G-90 (Coumarone resin manufactured by Nippon Steel Chemical Co., Ltd.) | 80 |

TABLE 3

| Composition of Coating Liquid | |
|---|---|
| Ingredients | Parts by Weight |
| Kaolin clay | 20 |
| Sodium metaphosphate | 0.2 |
| Calcium carbonate | 5 |
| Aqueous 20% solution of starch | 6 |
| 50% SBR latex | 7 |
| Dispersion of developer | 10 |
| Water | 51.8 |

Color forming properties, resistance to yellow staining, fastness to light and resistance to fading water of the 16 developer papers were determined according to the test methods set forth below. Results obtained are shown in Table 4.

Test Methods

(a) Color Forming Properties

Onto each of the developer papers was superposed a commercially available blue color-forming paper in which crystal violet lactone was utilized as a major color former, and the superposed papers were pressed with rolls. The density of the developer papers was measured 30 seconds or 1 hour after the pressing, using a Macbeth reflection densitometer (White standard board, 0.05; and black standard board, 1.76).

(b) Resistance to Yellow Staining

The developer papers were exposed to a low pressure mercury lamp for 16 hours. The Hunter whiteness of the papers was measured before and after the exposure

(c) Resistance to Fading in Water

Color was developed on the developer papers in the same manner as in the above color-forming property test (a), and the developed developer papers were exposed to a low pressure mercury lamp for 8 hours. The reflection density of the papers was measured before and after the exposure.

(d) Resistance to Fading in Water

Color was developed on the developer papers in the same manner as in the above color-forming property test (a), and the developed developer papers were immersed in water for 30 minutes. The reflective density of the papers was measured before and after the immersion.

It is apparent from the results shown in Table 4 that the developer papers prepared in examples according to the present invention are excellent in all the disclosed properties.

TABLE 4

| Results of Tests on the Properties of Developer Papers | | | | | | | | |
|---|---|---|---|---|---|---|---|---|
| | Color Forming Property | | Resistance to Yellow Staining | | Fastness to Light | | Resistance to Fading in Water | |
| Developer | After 30 sec. | After 1 Hour | Before Exposure | After Exposure | Before Exposure | After Exposure | Before Exposure | After Exposure |
| Example 1 | 0.55 | 0.74 | 89 | 88 | 0.77 | 0.67 | 0.77 | 0.58 |
| Example 2 | 0.56 | 0.74 | 89 | 88 | 0.77 | 0.67 | 0.77 | 0.59 |
| Example 3 | 0.57 | 0.75 | 90 | 89 | 0.77 | 0.65 | 0.77 | 0.62 |
| Example 4 | 0.58 | 0.74 | 90 | 90 | 0.76 | 0.66 | 0.76 | 0.63 |
| Example 5 | 0.57 | 0.73 | 89 | 88 | 0.75 | 0.66 | 0.75 | 0.63 |
| Example 6 | 0.54 | 0.73 | 89 | 88 | 0.75 | 0.63 | 0.75 | 0.61 |
| Example 7 | 0.54 | 0.74 | 89 | 88 | 0.76 | 0.65 | 0.76 | 0.62 |
| Example 8 | 0.57 | 0.73 | 89 | 88 | 0.75 | 0.62 | 0.75 | 0.63 |
| Example 9 | 0.56 | 0.73 | 89 | 88 | 0.75 | 0.65 | 0.75 | 0.63 |
| Example 10 | 0.57 | 0.74 | 89 | 88 | 0.76 | 0.66 | 0.76 | 0.61 |
| Example 11 | 0.57 | 0.73 | 89 | 88 | 0.75 | 0.63 | 0.75 | 0.62 |
| Comparative Example 1 | 0.36 | 0.68 | 88 | 87 | 0.69 | 0.59 | 0.69 | 0.49 |

TABLE 4-continued

| | Results of Tests on the Properties of Developer Papers | | | | | | | |
|---|---|---|---|---|---|---|---|---|
| | Color Forming Property | | Resistance to Yellow Staining | | Fastness to Light | | Resistance to Fading in Water | |
| Developer | After 30 sec. | After 1 Hour | Before Exposure | After Exposure | Before Exposure | After Exposure | Before Exposure | After Exposure |
| Comparative Example 2 | 0.38 | 0.69 | 89 | 87 | 0.70 | 0.59 | 0.70 | 0.52 |
| Comparative Example 3 | 0.41 | 0.57 | 89 | 88 | 0.63 | 0.38 | 0.64 | 0.32 |
| Comparative Example 4 | 0.39 | 0.60 | 89 | 87 | 0.62 | 0.35 | 0.62 | 0.13 |
| Comparative Example 5 | 0.37 | 0.62 | 89 | 77 | 0.64 | 0.18 | 0.64 | 0.62 |

Compared with hitherto known color developers, the color developers of the present invention is excellent in color density, resistance to yellow staining, resistance to light of formed images, fastness in water of formed images, and is capable of forming images at a markedly increased speed. The color developers are therefore suited for commercial production of high quality pressure-sensitive recording paper.

We claim:

1. A color developer for pressure-sensitive recording paper comprising a mixture of components comprising·
   (A) 100 parts by weight of a polyvalent metal salt of a co-condensation product consisting essentially of the reaction product of
      (1) a substituted salicylic acid;
      (2) an aromatic hydrocarbon; and
      (3) an aldehyde; and
   (B) 5 to 200 parts by weight of one or more members selected from the group consisting of petroleum resins, terpene resins, and coumarone resins.

2. A color developer of claim 1 wherein the substituted salicyclic acid has one of the following formulas

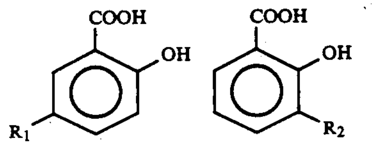

(I) (II)

wherein $R_1$ and $R_2$ each represents a hydrocarbyl group having 4 to 12 carbon atoms.

3. The color developer of claim 2 wherien $R_1$ and $R_2$ each represents a sec-butyl group, a ter-butyl group, a tert-octyl group, a nonyl group, a dodecyl group, a phenyl group, a benzyl group, an $\alpha$-methylbenzyl group or an $\alpha,\alpha$-dimethylbenzyl group.

4. The color developer of claim 2 wherien the aromatic hydrocarbon is selected from the group consisting of toluene, ethylbenzene, o-xylene, m-xylene, p-xylene and mesitylene.

5. The color developer of claim 1 wherein the aromatic hydrocarbon has 4 to 9 carbon atoms.

6. The color developer of claim 1 wherein the aldehyde is formaldehyde.

7. The color developer of claim 1 wherein the polyvalent metal is selected from zinc, tin, aluminum and nickel.

8. A pressure sensitive recording paper system comprising a paper substrate having a coating of the color developer of claim 1 thereon.

9. A color developer of claim 1 wherein said polyvalent metal salt is zinc. o-xylene, m-xylene, p-xylene and mesitylene; and
   (c) formaldehyde and
   (B) 5 to 200 parts by weight of one or more members selected from the group consisting of petroleum resins, terpene resins, and coumarone resins.

10. A color developer for use in pressure-sensitive recording paper produced by admixing components comprising:
   (A) 100 parts by weight of at least one member selected from the group consisting of zinc, tin, aluminum and nickel salts of a co-condensation product of a substituted salicylic acid, an aromatic hydrocarbon and formaldehyde obtainable by reacting, in the presence of an acidic catalyst, components consisting essentially of
      (a) one or more members selected from substituted salicyclic acids represented by the formula (I) or (II) of the following:

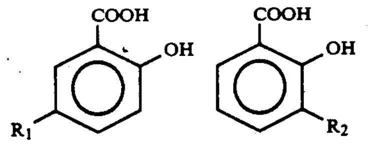

(I) (II)

wherein $R_1$ and $R_2$ each represents a sec-butyl group, a tert-butyl group, a tert-octyl grup, a nonyl group, a dodecyl group, a phenyl group, a benzyl grup, an $\alpha$-methylbenzyl group or an $\alpha$, $\alpha$-dimethylbenzy group;
      (b) one or more aromatic hydrocarbons selected from the group consisting of toluene, ethylbenzene, 11. A pressure sensitive recording paper system comprising a paper substrate having a coating of the color developer of claim 8 thereon.

12. A color developer of claim 8 wherein said polyvalent metal salt is zinc.

13. A color developer for use in pressure-sensitive recording paper produced by admixing components comprising:
   (A) 100 parts by weight of at least one member selected from the group consisting of zinc, tin, aluminum and nickel salts of a co-condensation product of a substituted salicylic acid, an aromatic hydrocarbon and formaldehyde obtainable by reacting, in the presence of an acidic catalyst, components consisting of (a) one or more members selected from substituted salicyclic acids represented by the formula (I) or (II) of the following:

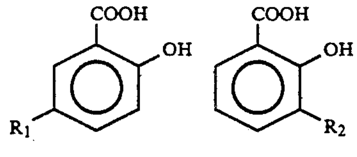

(I) (II)

wherein $R_1$ and $R_2$ each represents a sec-butyl group, a tert-butyl group, a tert-octyl grup, a nonyl group, a dodecyl group, a phenyl group, a benzyl grup, an α-methylbenzyl group or an α, α-dimethylbenzy group;

(b) one or more aromatic hydrocarbons selected from the group consisting of toluene, ethylbenzene, o-xylene, m-xylene, p-xylene and mesitylene; and (c) formaldehyde; and (B) 5 to 200 parts by weight of one or more members selected from the group consisting of petroleum resins, terpene resins, and coumarone resins.

14. A color developer of claim 13 wherein asid polyvalent metal salt is zinc.

* * * * *

UNITED STATES PATENT AND TRADEMARK OFFICE
CERTIFICATE OF CORRECTION

PATENT NO. : 5,034,370
DATED : July 23, 1991
INVENTOR(S) : Yukio Saeki; Yukio Tokunaga

It is certified that error appears in the above-identified patent and that said Letters Patent is hereby corrected as shown below:

Column 13, line 50, delete "wherien" and substitute -- wherein --.
Column 13, line 55, delete "wherien" and substitute -- wherein --.
Column 14, line 18, delete "o-xylene, m-xylene, p-xylene and".
Column 14, delete lines 19 to 23.
Column 14, line 46, delete "sec-butyl" and substitute -- sec-butyl --.
Column 14, line 47, delete "tert-butyl" and substitute -- tert-butyl --.
Column 14, line 47, delete "tert-octyl grup" and substitute -- tert-octyl group --.
Column 14, line 49, delete "grup" and substitute -- group --.
Column 14, line 53, after "zene," insert -- o-xylene, m-xylene, p-xylene and mesitylene; and
(c) formaldehyde and
(B) 5 to 200 parts by weight of one or more members selected from the group consisting of petroleum resins, terpene resins, and coumarone resins. --
Column 14, line 56, delete "claim 8" and substitute -- claim 10 --.
Column 14, line 57, delete "claim 8" and substitute -- claim 10 --.
Column 15, line 13, delete "sec-butyl" and substitute -- sec-butyl --.
Column 15, line 14, delete "tert-butyl" and substitute -- tert-butyl --.
Column 15, line 14, delete "tert-octyl" and substitute -- tert-octyl --.
Column 16, line 2, delete "grup" and substitute -- group --.

UNITED STATES PATENT AND TRADEMARK OFFICE
CERTIFICATE OF CORRECTION

PATENT NO. : 5,034,370

DATED : July 23, 1991

INVENTOR(S) : Yukio Saeki, et al

It is certified that error appears in the above-identified patent and that said Letters Patent is hereby corrected as shown below:

Column 16, line 12, delete "asid" and substitute -- said--.

Signed and Sealed this

Twenty-second Day of December, 1992

*Attest:*

DOUGLAS B. COMER

*Attesting Officer* *Acting Commissioner of Patents and Trademarks*